(12) United States Patent
Maeda et al.

(10) Patent No.: US 7,224,835 B2
(45) Date of Patent: May 29, 2007

(54) THREE-DIMENSIONAL OBJECT RECOGNIZING APPARATUS, METHOD AND COMPUTER PROGRAM PRODUCT

(75) Inventors: Kenichi Maeda, Kamakura (JP); Osamu Yamaguchi, Yokohama (JP); Kazuhiro Fukui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 638 days.

(21) Appl. No.: 10/370,712

(22) Filed: Feb. 24, 2003

(65) Prior Publication Data
US 2003/0161537 A1 Aug. 28, 2003

(30) Foreign Application Priority Data
Feb. 25, 2002 (JP) ............................ 2002-047331

(51) Int. Cl.
*G06K 9/68* (2006.01)
*G06K 9/00* (2006.01)
(52) U.S. Cl. .................... 382/218; 382/118; 382/115
(58) Field of Classification Search ................ 382/154, 382/218, 118
See application file for complete search history.

(56) References Cited

U.S. PATENT DOCUMENTS 4,752,957 A 6/1988 Maeda 6,493,465 B2 * 12/2002 Mori et al. ................... 382/209
6,996,257 B2 * 2/2006 Wang ........................... 382/118
2005/0147291 A1 * 7/2005 Huang et al. ............... 382/159

FOREIGN PATENT DOCUMENTS

JP 11-265452 9/1999
JP 2000-30065 1/2000

OTHER PUBLICATIONS

Osamu Yamaguchi, et al. "Face Recognition Using Temporal Image Sequence," Proceedings of the Third International Conference on Automatic Face and Gesture Recognition (FG98), 1998, pp. 318-323.

* cited by examiner

*Primary Examiner*—Jingge Wu
*Assistant Examiner*—John B. Strege
(74) *Attorney, Agent, or Firm*—Oblon, Spivak, McClelland, Maier & Neustadt, P.C.

(57) ABSTRACT

An object recognizing apparatus can execute accurate object recognition based on dictionaries each created from a predetermined number of patterns, by computing a similarity between a subspace in each dictionary and a subspace created from input images. In this apparatus, images of a to-be-identified object obtained by an image input unit is expressed in the form of an input subspace by an inter-subspace-angle computing unit. The angles between the input subspace and the subspace of each dictionary stored in a dictionary storing unit is computed. An identifying unit identifies a to-be-identified object based on the angles (the degrees of similarity) computed by the inter-subspace-angle computing unit.

9 Claims, 5 Drawing Sheets

THREE-DIMENSIONAL OBJECT RECOGNIZING APPARATUS, METHOD AND COMPUTER PROGRAM PRODUCT

CROSS-REFERENCE TO RELATED APPLICATIONS

This application is based upon and claims the benefit of priority from the prior Japanese Patent Application No. 2002-047331, filed Feb. 25, 2002, the entire contents of which are incorporated herein by reference.

BACKGROUND OF THE INVENTION

1. Field of the Invention

The present invention relates to an apparatus, a method and a computer program product for recognizing and identifying a three-dimensional object.

2. Description of the Related Art

Jpn. Pat. Appln. KOKAI Publication No. 11-265452, for example, discloses a method for recognizing/identifying a three-dimensional object using images obtained by photographing the object in various directions (hereinafter referred to as "conventional method").

In the conventional method for using a subspace method, a dictionary, in which a three-dimensional object is represented in the form of subspaces, is created based on the vectors extracted from a plurality of images taken from the three-dimensional object in advance. Similarly, a subspace is formed from the vectors extracted from input images taken by a camera. The angle between each subspace in the dictionary (hereinafter referred to as "dictionary subspace") and the subspace of the input images (hereinafter referred to as "input subspace") is measured. If a certain dictionary subspace forms a smallest angle with respect to the input subspace, it is considered to have the highest similarity (=the identified object).

In the actual recognition process, the eigenvalue $\lambda i$ (i=natural number) of the matrix defined using the basis vectors of an input subspace and a dictionary subspace is obtained, and is used to compute the similarity corresponding to the angle $\theta i$ (i=natural number) between the input subspace and the dictionary subspace. More specifically, the highest eigenvalue $\lambda_1$ itself, or the ratio r of the highest eigenvalue to the second highest eigenvalue $\lambda_2$, $r=\lambda_2/\lambda_1$, is used as a similarity.

However, if the highest eigenvalue $\lambda_1$ itself, or the ratio r of the highest eigenvalue to the second highest eigenvalue $\lambda_2$, $r=\lambda_2/\lambda_1$, is used as a similarity, there is a case where an actual three-dimensional object cannot be discriminated from its picture. This is because if an image of the picture is identical to an image registered in a dictionary, the actual object cannot be discriminated from the picture.

This raises a serious problem, especially when security system based on face recognition is concerned. Security system may easily be compromised if a picture of a person is presented instead of the person.

BRIEF SUMMARY OF THE INVENTION

It is the object of the invention to provide a three-dimensional-object recognizing apparatus, a method and a computer program product for discriminating a picture from a three-dimensional object.

To achieve the object, according to an aspect of the invention, there is provided an object recognizing apparatus comprising: an image acquiring unit configured to acquire images of an object in different directions; a subspace creating unit configured to create an N-dimensional subspace from the images acquired; a dictionary which stores basis vectors included in an M-dimensional subspace created from images of a comparison object to be compared with the object, the images of the comparison object being obtained in different directions; an eigenvalue acquiring unit configured to acquire eigenvalues of a matrix X, the eigenvalues being used as angles between the N-dimensional subspace and the M-dimensional subspace, the matrix being expressed by following equations:

$$X=(x_{ij}),$$

$$x_{ij} = \sum_{m=1}^{M} (\psi_i, \phi_m)(\phi_m, \psi_j), \text{ or}$$

$$x_{ij} = \sum_{n=1}^{N} (\phi_i, \psi_n)(\psi_n, \phi_j),$$

where $\phi 1, \phi 2, \phi 3, \ldots, \phi N$ represent basis vectors of the N-dimensional subspace, and $\phi 1, \phi 2, \phi 3, \ldots, \phi M$ represent basis vectors of the M-dimensional subspace; and an identifying unit configured to identify the object based on a similarity determined by the eigenvalues acquired, at least one of a second highest one and a third highest one of the eigenvalues being used as the similarity.

According to another aspect of the invention, there is provided an object recognizing method comprising: acquiring images of an object in different directions; creating an N-dimensional subspace from the images acquired; acquiring eigenvalues of a matrix X, the eigenvalues being used as angles between the N-dimensional subspace and an M-dimensional subspace stored in a dictionary, the matrix being expressed by following equations:

$$X=(x_{ij}),$$

$$x_{ij} = \sum_{m=1}^{M} (\psi_i, \phi_m)(\phi_m, \psi_j), \text{ or}$$

$$x_{ij} = \sum_{n=1}^{N} (\phi_i, \psi_n)(\psi_n, \phi_j),$$

where $\phi 1, \phi 2, \phi 3, \ldots, \phi N$ represent basis vectors of the N-dimensional subspace, and $\phi 1, \phi 2, \phi 3, \ldots, \phi M$ represent basis vectors of the M-dimensional subspace; and identifying the object based on a similarity determined by the eigenvalues acquired, at least one of a second highest one and a third highest one of the eigenvalues is used as the similarity.

According to another aspect of the invention, there is provided an object recognizing computer program product configured to store program instructions for execution on a computer system enabling the computer system to perform: acquiring images of an object in different directions; creating an N-dimensional subspace from the images acquired; acquiring eigenvalues of a matrix X, the eigenvalues being used as angles between the N-dimensional subspace and an M-dimensional subspace stored in a dictionary, the matrix X being expressed by following equations:

$$X=(x_{ij}),$$

$$x_{ij} = \sum_{m=1}^{M}(\psi_i, \phi_m)(\phi_m, \psi_j), \text{ or}$$

$$x_{ij} = \sum_{n=1}^{N}(\phi_i, \psi_n)(\psi_n, \phi_j),$$

where $\phi1, \phi2, \phi3, \ldots, \phi N$ represent basis vectors of the N-dimensional subspace, and $\phi1, \phi2, \phi3, \ldots, \phi M$ represent basis vectors of the M-dimensional subspace; and identifying the object based on a similarity determined by the eigenvalues acquired, at least one of a second highest one and a third highest one of the eigenvalues being used as the similarity.

DETAILED DESCRIPTION OF THE INVENTION

Embodiments of the invention will be described with reference to the accompanying drawings.

(First Embodiment)

Figure 1:
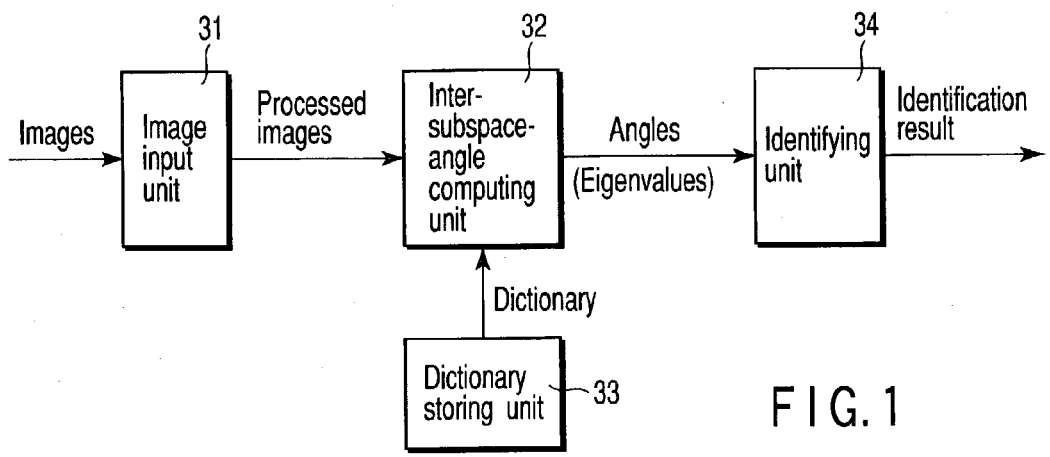
FIG. 1 is a block diagram illustrating an object recognizing apparatus according to a first embodiment of the invention.

FIG. 1 shows an object recognizing apparatus according to a first embodiment of the invention. This apparatus comprises an image input unit 31 formed of, for example, a camera for photographing an object, an inter-subspace-angle computing unit 32 for computing the angles between subspaces related to a photographed object and an object registered in a dictionary, a dictionary storing unit 33 which stores dictionaries as pre-created patterns for object identification, and an identifying unit 34 for recognizing an object based on the angles between subspaces computed by the inter-subspace-angle computing unit 32.

The image input unit 31 is used to acquire images of a three-dimensional object in various directions. It is natural to use a plurality of cameras in order to input images observed in a plurality of directions. However, even a single camera can acquire a plurality of images of an object if the object is moving or the camera is moving. In the embodiment, a single camera is used in light of cost and space.

Figure 2:
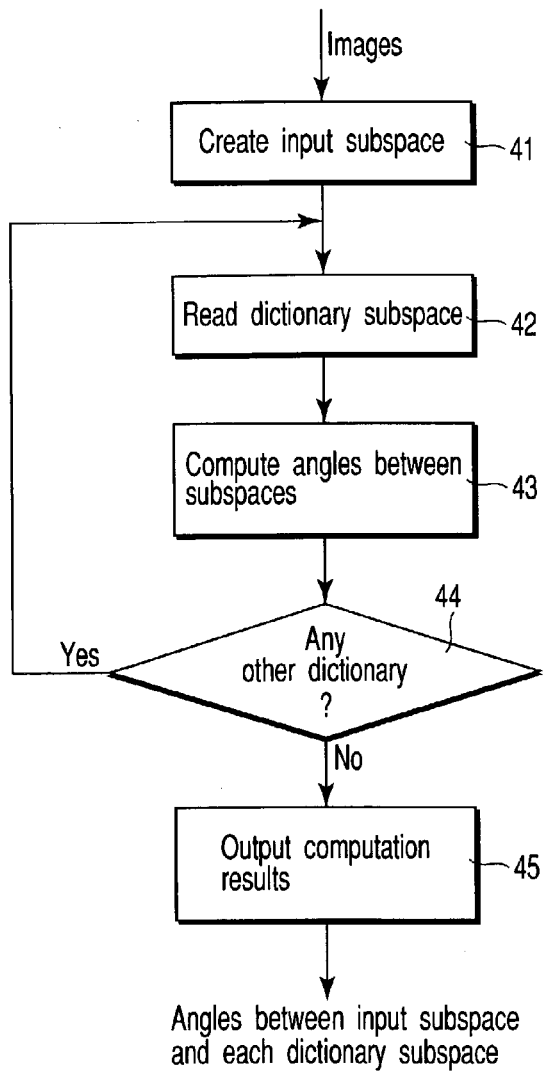
FIG. 2 is a flowchart useful in explaining processing executed by the inter-subspace-angle computing unit 32 shown in FIG. 1.

The inter-subspace-angle computing unit 32 is a microprocessor system for inputting the images output from the image input unit 31 and executing the process illustrated in the flowchart of FIG. 2. In short, input images are vectorized to form a subspace (input subspace) (step 41), the basis vectors of a dictionary subspace are read from a dictionary (step 42), eigenvalues as parameters corresponding to the angles between the dictionary subspace and the input subspace are computed (step 43), this process is repeated in another loop to examine another dictionary (step 44), and the resultant eigenvalues, for example, are output to the identifying unit 34 (step 45). Details of this process will be described later.

The dictionary storing unit 33 stores a plurality of dictionaries. Basically, at least one dictionary is assigned to one object. Accordingly, if one hundred objects are registered, the dictionary storing unit 33 stores at least one hundred dictionaries.

The contents of each dictionary stored in the dictionary storing unit 33 include M basis vectors of a dictionary subspace, and information, such as an object name, for identifying a corresponding registered object. The M basis vectors of each dictionary subspace are created from the images acquired when the corresponding object is registered. It may be assumed that the number M is different values between different dictionaries.

The dictionary storing unit 33 outputs information for identifying the object registered in each dictionary, together with the computation results of the inter-subspace-angle computing unit 32.

As the dictionary storing unit 33, a stationary device of a large capacity, such as an HDD (hard disk drive), is used. Alternatively, a portable medium, such as an IC card, may be used as the dictionary storing unit 33. In this case, a single IC card is assigned to a single object to be identified, and is exchanged for another each time identification is executed.

Figure 3:
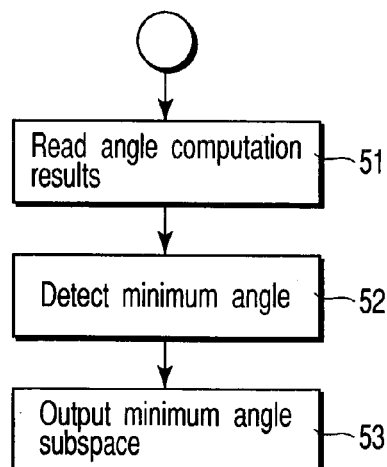
FIG. 3 is a flowchart useful in explaining processing executed by the identifying unit 34 shown in FIG. 1.

The identifying unit 34 is a microprocessor for executing processing illustrated by the flowchart of FIG. 3, using the eigenvalues computed by the inter-subspace-angle computing unit 32. In short, eigenvalues are read which are used as parameters corresponding to inter-subspace angles computed by the inter-subspace-angle computing unit 32 (step 51), the dictionary, in which the similarity computed from eigenvalues is highest, is detected (step 52), and the information for identifying an object, registered in the dictionary with the highest similarly, is output as an identification result (step 53).

Referring now to FIG. 2, the process executed by the inter-subspace-angle computing unit 32 will be described.

Firstly, input images are vectorized, and a subspace is formed from the resultant vectors (step 41).

The vectorization of each input image means the generation of a vector having p×q components. The p×q components indicate the p×q average intensity of pixel values of p×q equal-size regions into which each input image is divided. If each input image has a small number of pixels, the number of the pixels may be used as the dimensions of a vector. This processing is performed on a number K of input images to create a number K of vectors.

From the number K of the created vectors, a subspace of N dimensions (N≦K) is formed. The creation of the N-dimensional subspace is equivalent to the computation of a number N of basis vectors $\{\phi1, \phi2, \phi3, \ldots, \phi N\}$. If the number K of images is relatively small (not more than 20 to 30 dimensions), the basis vectors are computed by the method called "Schmidt Orthogonalization". On the other hand, if the number is large, the principal component analysis method called "K-L Expansion" is used to reduce the number of dimensions.

The angles between an input subspace and a dictionary subspace are computed for each dictionary (step 42).

Specifically, the angles are obtained by reading one dictionary from the dictionary storing unit 33, and computing the eigenvalues of the matrix X expressed by the following equations, using the M-dimensional basis vectors of the dictionary subspace $\{\phi 1, \phi 2, \phi 3, \ldots, \phi M\}$ and the N-dimensional basis vectors of the input subspace $\{\phi 1, \phi 2, \phi 3, \ldots, \phi N\}$.

$$X=(x_{ij}),$$

$$x_{ij} = \sum_{m=1}^{M}(\psi_i, \phi_m)(\phi_m, \psi_j), \text{ or}$$

$$x_{ij} = \sum_{n=1}^{N}(\phi_i, \psi_n)(\psi_n, \phi_j).$$

As recognized from a below equation, each eigenvalue $\lambda$ of the matrix X expressed by the above equations is equal to the square of the cosine value of a corresponding angle between subspaces. Accordingly, the same effect as obtained by detecting the angle can be obtained by computing $\lambda$.

$$\lambda_i = \cos^2 \theta_i (i=1,2,3,\ldots)$$

The i in above equation indicates the sequence of eigenvalues, beginning from the highest one. In the embodiment, since the second highest eigenvalue $\lambda_2$ is used, it is computed by well-known "Power Method" or "Householder QR method" (step 43).

Thereafter, the process from the step 42 is repeated to compute eigenvalues from the input subspace and each dictionary subspace (step 44).

Lastly, the obtained angles (eigenvalues) are output to the identifying unit 34 (step 45).

Figure 4:
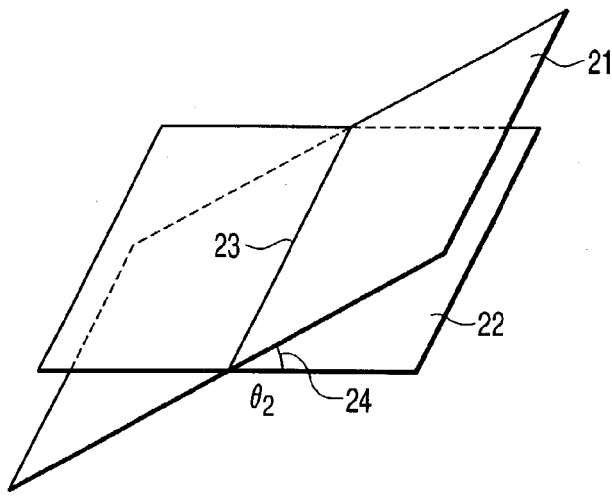
FIG. 4 is a view illustrating, in the three-dimensional space, the angle between two subspaces.

Referring to FIG. 4, the relationship between the eigenvalue $\lambda$ and the angle $\theta$ will be described.

FIG. 4 is a view useful in explaining the overlapping state of a dictionary subspace 21 and an input subspace 22. Each of the actual dictionary subspace and the input subspace is a highly dimensional space. However, for facilitating the explanation and the illustration, both subspaces are made two-dimensional spaces in FIG. 4.

In FIG. 4, since the dictionary subspace 21 and the input subspace 22 overlap each other at line segment 23, the highest eigenvalue $\lambda_1$ is 1, and the corresponding angle $\theta_1$ is 0. The angle $\lambda_2$ corresponding to the second highest eigenvalue $\lambda_2$ is denoted by reference numeral 24 shown in FIG. 4.

Concerning $\lambda$, $1 \geq \lambda_1 > \lambda_2 > \lambda_3 > \lambda_4 \ldots$ is established. The higher the subindex, the lower the value of $\lambda$. For example, $\lambda_1=1$, $\lambda_2=0.8$, $\lambda_3=0.5$, $\lambda_4=0.2, \ldots$.

Referring to FIG. 3, the identification process executed by the identifying unit 34 will be described.

Firstly, the eigenvalues computed by the inter-subspace-angle computing unit 32 are read (step 51).

Subsequently, the dictionary, in which the similarity between its subspace and an input subspace is highest, is detected (step 52).

As described above, since the relationship between the angle and the eigenvalue is given by the equation $\lambda i = \cos^2 \theta i$, the measurement of the angle is equivalent to the computation of the eigenvalue. Accordingly, the similarity will be defined using the eigenvalue. In the embodiment, $\lambda_2$ itself is used as the similarity between the input subspace and the dictionary subspace. It is determined that the object registered in a dictionary is identical to the object whose picture is used as an input image, if $\lambda_2$ related to them is highest.

In the prior art, only the highest eigenvalue $\lambda_1$ is used as the similarity, and the dictionary is determined to be identical to the input image, if $\lambda_1 \approx 1$. However, the subspace that includes an overlapping line segment as shown in FIG. 4 is not limited to the dictionary subspace 21 or the input subspace 22. In particular, if subspaces are formed for an object and an object similar to the former (e.g. a picture thereof), it is very possible that they contain an overlapping portion such as the line segment 23. In general, the use of $\lambda_1$ is effective to discriminate objects of different shapes, but not so effective to discriminate an object from its picture.

On the other hand, if $\lambda_2$ is used as the similarity, the similarity between an object and a corresponding dictionary is computed lower than an actual value if only an image of the object photographed in one direction is input. However, if the object is photographed in a plurality of directions (in the case of a picture, this cannot be performed), the similarity of the object and the corresponding dictionary is higher. Thus, the object can be reliably discriminated from its picture.

As a general tendency, the three eigenvalues $\lambda_2$, $\lambda_3$ and $\lambda_4$ are substantially related to the degree of freedom of rotation of an object. These three eigenvalues are often related to the horizontal rotation of the object, the vertical rotation, and the lateral rotation. However, the same cannot be said of all cases, and these eigenvalues may be related to, for example, the modification of the object.

Although the similarity is checked using only $\lambda_2$ in the embodiment, $\lambda_3$ or $\lambda_4$ may be used instead. Alternatively, $\lambda_1 \times \lambda_2$ may be used. In this case, although FRR (Fault Rejection Rate) may slightly be high as compared to the case of using only $\lambda_2$, FAR (Fault Acceptance Rate) is low.

The information for identifying the object, registered in the dictionary detected at the step 52, is output as an identification result (step 53).

In the prior art, $\lambda_1$ or $\lambda_2/\lambda_1$ is used as the similarity. However, when using only $\lambda_1$, an object and its picture cannot be discriminated from each other. Further, when using $\lambda_2/\lambda_1$, the similarity is identical in different cases if the change rate of $\lambda_1$ is the same as that of $\lambda_2$. For example, the case where $\lambda_2=0.5$ and $\lambda_2=0.4$ (the similarity is low) cannot be discriminated from the case where $\lambda_1=1$ and $\lambda_2=0.8$ (the similarity is high), since $\lambda_2/\lambda_1$ is 0.8 in both cases.

However, if $\lambda_2$, $\lambda_3$ or $\lambda_4$, etc. is used, such a problem does not occur. Further, the product of $\lambda_1$ and $\lambda_2$ is used, no such problem occur since even if the change rates of $\lambda_1$ and $\lambda_2$ are identical, their products, $\lambda_1 \times \lambda_2$, assume different values.

Figure 5:
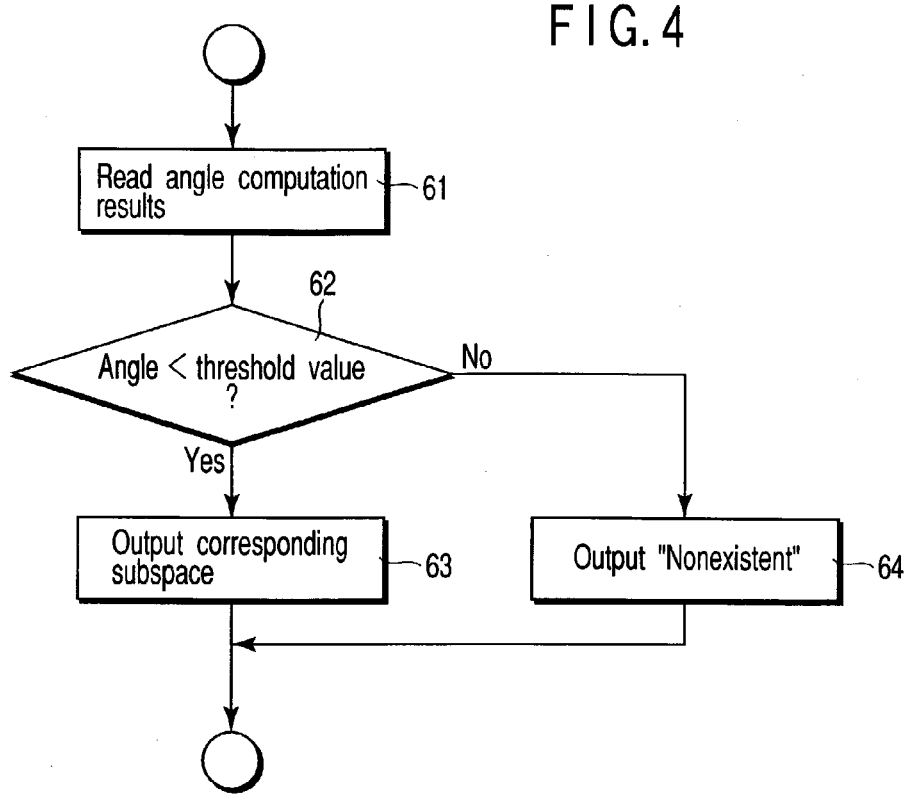
FIG. 5 is a flowchart useful in explaining identification processing executed by the identifying unit 34.

The identifying unit 34 may also execute the process as illustrated in the flowchart of FIG. 5.

In the process illustrated in the flowchart of FIG. 5, only if the eigenvalue is higher than a predetermined threshold value, the information registered in the dictionary is output as an identification result. If the eigenvalue is not higher than the predetermined threshold value, a message "Nonexistent" is output. This processing is effective especially when one object, for which only one dictionary is prepared, is identified.

The flowchart of FIG. 5 will be described. Although "Angle" is used in FIG. 5, there is no difference between the case of using eigenvalues and the case of using angles, except that the meaning of the result of comparison of an eigenvalue or the angle and a threshold value differs in the two cases, since the angle and the eigenvalue have the relationship expressed by the equation $\lambda i = \cos^2 \theta i$.

Firstly, the eigenvalue output from the inter-subspace-angle computing unit 32 is read (step 61). The read eigenvalue is compared with a predetermined threshold value. At this stage, the similarity may be computed from the eigenvalue and compared with the predetermined value (step 62). If the eigenvalue is higher than the predetermined threshold value (in the case of using the angle, if the angle is smaller than a predetermined threshold value), a corresponding dictionary subspace is output as an identification result (step 63). If, on the other hand, the eigenvalue is lower than the predetermined threshold value, it is determined that no corresponding dictionary subspace is found, and a message "Nonexistent" is output as an identification result (step 64).

Lastly, a description will be given of a manner for creating a dictionary to be registered in the dictionary storing unit 33. The recognizing apparatus has a mode switch (not shown), and a user of the apparatus can switch the mode between the dictionary registration mode and object recognition mode by operating the mode switch.

Firstly, the switch is operated to switch the apparatus to the dictionary registration mode. Subsequently, a three-dimensional object is taken by a camera in various directions, thereby acquiring several tens to several hundreds of image patterns of the object, and inputting them to the image input unit 31. The image input unit 31 sequentially outputs the images to the inter-subspace-angle computing unit 32. When the dictionary registration mode is established, the inter-subspace-angle computing unit 32 creates an input subspace from the input images, and registers the obtained basis vectors in a dictionary. Together with the basis vectors, information on the object, such as an identification number, name, etc., is registered in the dictionary. The "information for identifying the object" is input using an interface such as a keyboard, not shown, connected to the inter-subspace-angle computing unit 32.

In the embodiment, basis vectors are registered in the dictionary 33. However, images may be recorded and basis vectors may be created from the images when necessary.

As described above, the object recognizing apparatus can discriminate a picture of a three-dimensional object from the object itself.

(Second Embodiment)

A face recognizing apparatus according to a second embodiment of the invention will now be described with reference to the corresponding drawings.

Figure 6:
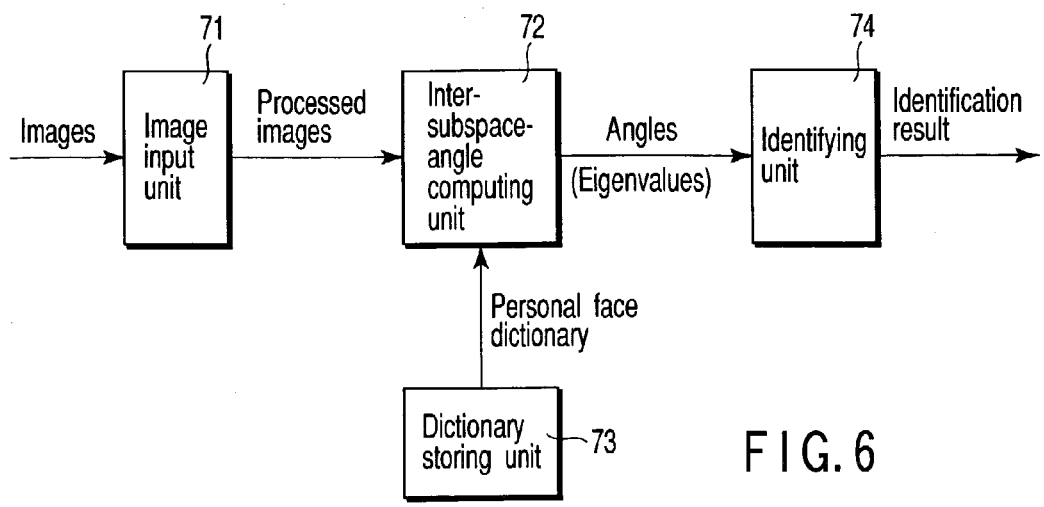
FIG. 6 is a block diagram illustrating an object recognizing apparatus according to a second embodiment of the invention.

FIG. 6 is a block diagram illustrating the face recognizing apparatus of the second embodiment. The structure of FIG. 6 is similar to that of the first embodiment, and therefore no description will be given of the corresponding elements.

An image input unit 71 extracts only a portion necessary for identification from each image taken by a camera (not shown), and outputs it to an inter-subspace-angle computing unit 72.

Figure 7:
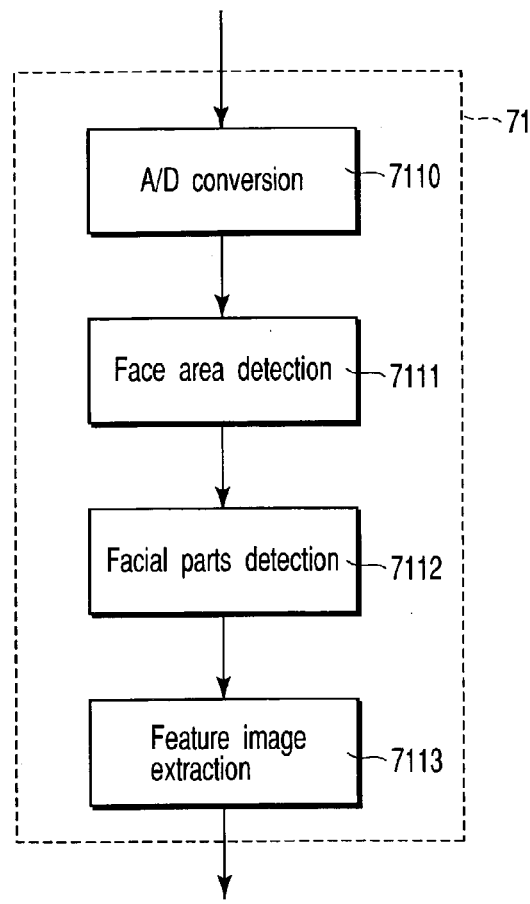
FIG. 7 is a flowchart useful in explaining face-extracting processing executed by the image input unit 71 shown in FIG. 6.

Specifically, the image input unit 71 performs the process illustrated by the flowchart of FIG. 7. Firstly, each image output from the camera is A/D converted (step 7110), and a face area in each image is detected (step 7111). Subsequently, the facial parts of the face, such as eyes, a nose, ears, a mouth, etc., are detected, and information concerning the position and type of each facial parts is output (step 7112). After that, based on the facial parts information, the face area is cropped to a predetermined size and shape, and is converted into an image of p×q pixels. This image is output (step 7113).

In the face area detection of the step 7111, template matching is performed to detect the facial region using template of face detection prepared in advance. The face area detection method is not limited to this. Alternatively, Eigenface method or subspace method is utilized for calculating the measure or the similarity.

In the facial parts detection of the step 7112, template matching is performed to detect the position of the eyes, the nose, the ears and the mouth, thereby outputting information concerning the type and the position of each of the detected facial parts. The facial parts detection method is not limited to this. Alternatively, the method may be employed which is described, for example, in Institute of Electronics, Information and Communication Engineers, Treatise Document (D), Vol. J80-D-11, No. 8, pp. 2170–2177 (1997), "Facial Feature Point Extraction Method Based on Combination of Shape Extraction and Pattern Matching" written by Kazuhiro Fukui and Osamu Yamaguchi.

Figure 8:
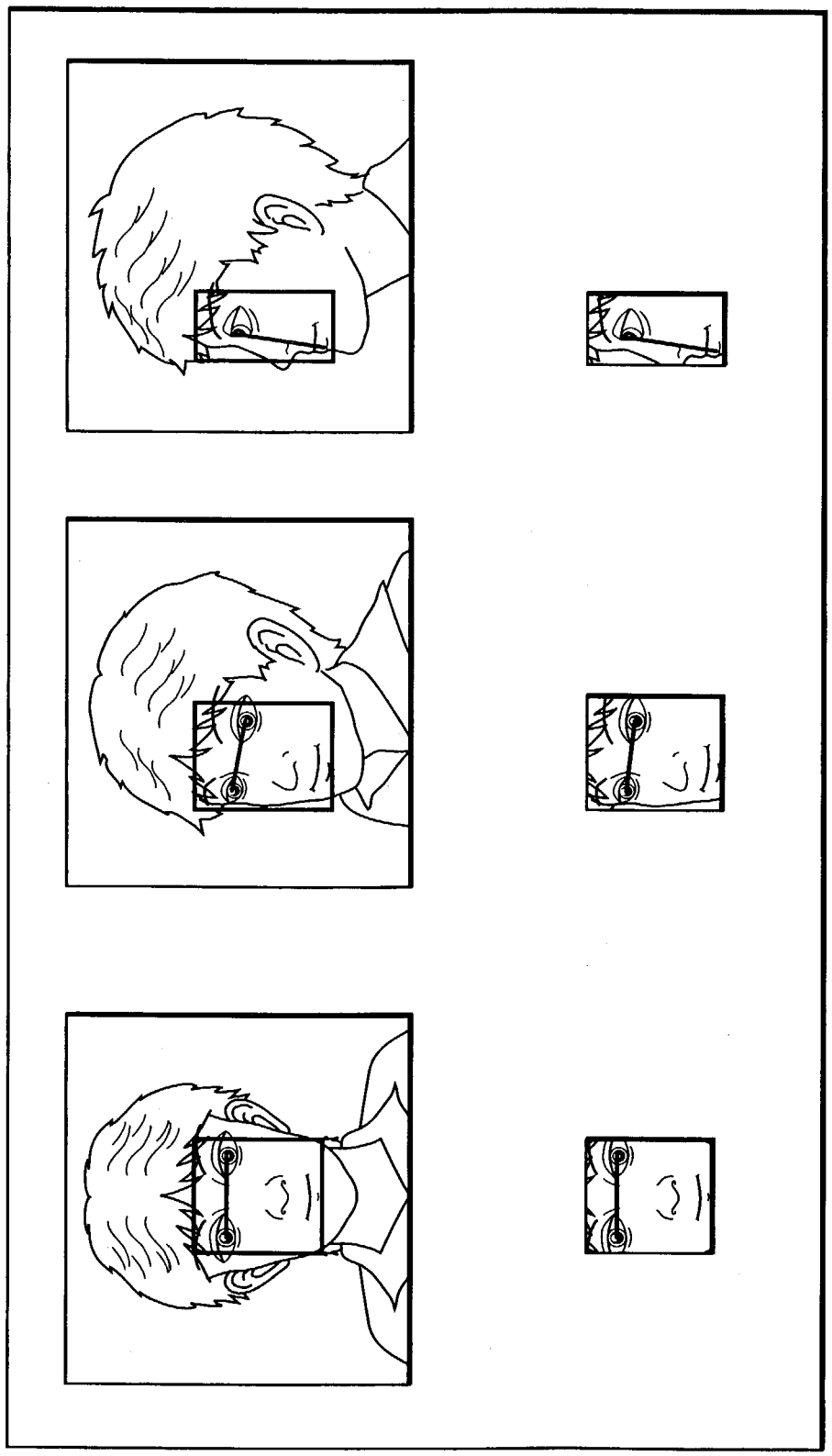
FIG. 8 is a view illustrating feature vector images obtained in extremely different directions.

In the feature extraction at the step 7113, the face area is cropped to a predetermined size and shape based on the detected facial parts information, and pixel-intensity information contained in the face region is used as feature. FIG. 8 is a view useful in explaining the cropping process. The upper images are the entire input images, while the lower images are images as cropped results.

Pay attention to the line segment that connects two facial parts, such as the left and right eyes, or one eye and the mouth. If this line segment is contained within the detected rectangular area at a predetermined ratio, i.e., if the line does not fall outside the rectangular area and occupies a not so small portion of the area, each lower image of FIG. 8 is converted into an area of p×q pixels. If, on the other hand, the line segment is not contained in the rectangular area at the predetermined ratio, the rectangular area is appropriately expanded or contracted to contain the line segment at the predetermined ratio, thereby converting the extracted area into a feature vector image of p×q pixels.

Figure 9:
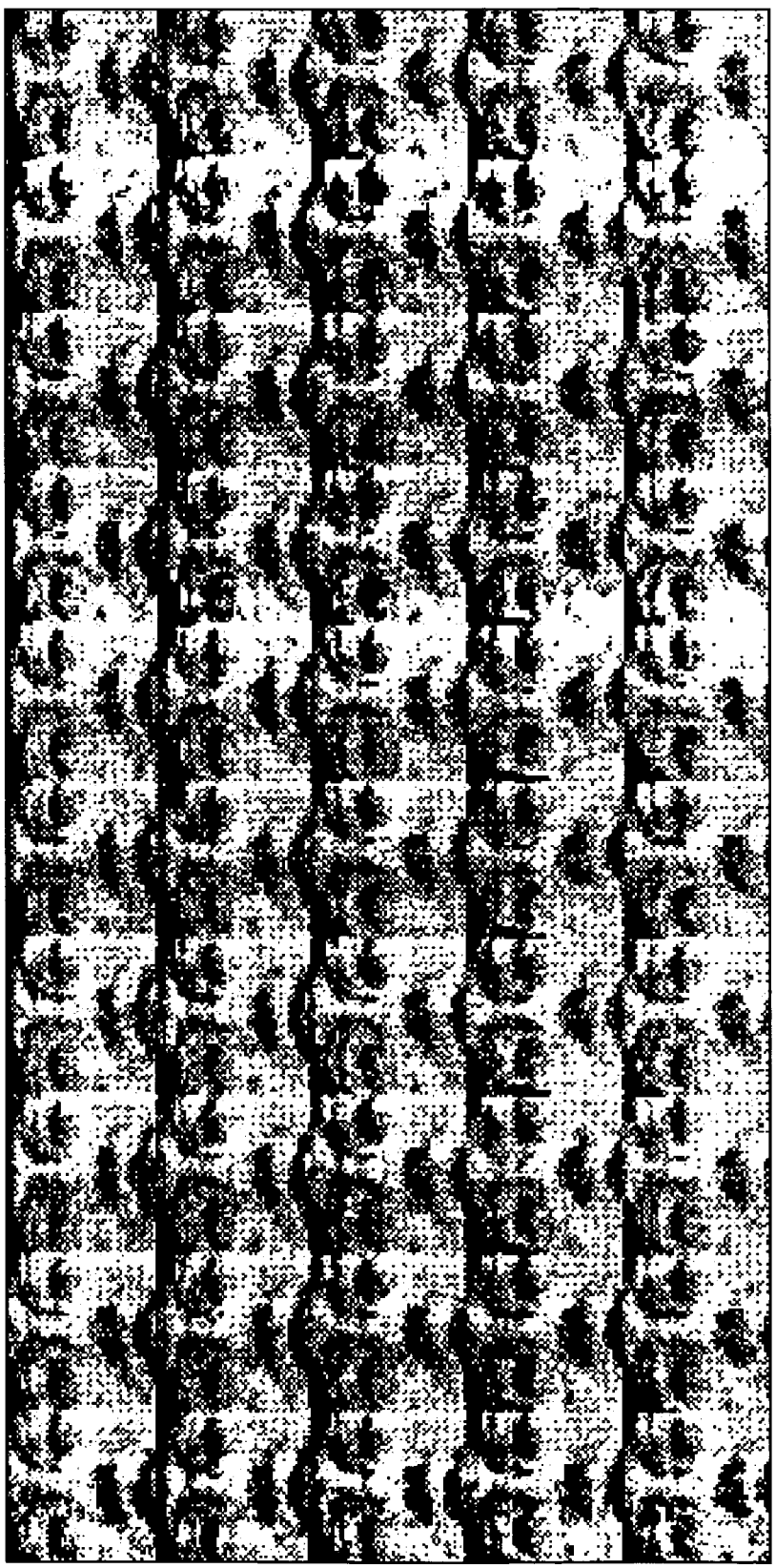
FIG. 9 is a view illustrating examples of feature vector images.

This processing is executed on the sequential images. For example, if image input is performed while a certain person is looking at substantially the front surface of a camera, a large number of feature vector images arranged in a time-series manner are acquired as shown in FIG. 9. The feature vector images shown in FIG. 9 are acquired in a time-series manner by the camera. The feature vector images shown in FIG. 9 are the images of a certain person.

The thus-acquired feature vector images are sequentially output to the inter-subspace-angle computing unit 72.

The inter-subspace-angle computing unit 72 uses the intensity level of each pixel of a feature vector image as a feature vector element, generates an p×q dimensional feature vector, computes a correlation matrix C of face image data, and subjects the matrix to K-L expansion to obtain orthonormal eigenvectors and then a subspace.

To compute a subspace, C is calculated from the following equation by substituting, for di, feature vectors corresponding to a predetermined number K of images are input.

$$c = \sum_{i=1}^{K} d_i d_i^T$$

After that, eigenvectors are computed based on C, using a known method, such as the Jacobi method or QR decomposition, thereby obtaining an input subspace.

In light of the fact that a large amount of data is input as time-series data as shown in FIG. 9, the input subspace may be computed, using an orthogonal iteration method that is one of subspace iteration methods in which subspaces are sequentially computed.

To compute the angles between the input subspace and the dictionary subspace, the inter-subspace-angle computing unit 72 calculates the eigenvalues of the matrix X expressed by the above equations and outputs them to an identifying unit 74.

A dictionary storing unit 73 stores dictionary subspaces. At least one dictionary is assigned to one person. Accordingly, if one hundred persons are registered, the dictionary storing unit 73 stores at least one hundred dictionaries. A plurality of dictionaries may be assigned to one person. For example, concerning one person, a plurality of types of faces, such as "unshaven face", "face with glasses", "face with no makeup", "laughing face", "angry face", etc., can be registered. By registering a plurality of face types, the face of a person can be further accurately identified. Even when a plurality of dictionaries are assigned to one person, the dictionary storing unit 73 stores them as different dictionaries.

The identifying unit 74 computes the similarity between the input subspace and the dictionary subspace from the input eigenvalues, and outputs, as the identification result, the information for identifying the person registered in the dictionary of the highest similarity.

To compute the similarity between subspaces in the identifying unit 74, if the highest eigenvalue $\lambda_1$ of the matrix is used as the similarity as in the first embodiment, there is a case where a picture of a face cannot be discriminated from the face itself. To solve this problem, the second eigenvalue, the third eigenvalue or the fourth eigenvalue is used as the parameter. It is confirmed from the experiments that when a picture is input, the second eigenvalue, the third eigenvalue or the fourth eigenvalue is not a sufficiently high value.

As stated in the first embodiment, it is desirable to use the second eigenvalue $\lambda_2$ to identify a face when the face is being one-directionally (for example, horizontally or vertically) rotated. Further, it is desirable to use the second eigenvalue $\lambda_2$ and the third eigenvalue $\lambda_3$ to identify the face when the face is being two-dimensionally (for example, horizontally and vertically) rotated.

Even if a picture is vertically or horizontally rotated, the resultant image is just an image obtained by subjecting the original image to affine transformation, and never provides a side view, which differs from the case of rotating a real face. Thus, to distinguish the real face from its picture, it is preferable to use the second eigenvalue $\lambda_2$ or third eigenvalue $\lambda_3$ that is related to horizontal or vertical rotation.

Furthermore, the characteristic of the FAR or FRR can be changed using the product of a plurality of eigenvalues as the similarity, instead of using a single eigenvalue. For example, the use of $\lambda_1 \times \lambda_2$ increases FRR but suppresses FAR, as compared to the use of only $\lambda_2$. In other words, the use of $\lambda_1 \times \lambda_2$ increases the probability of misidentification of a real person for another person, but reduces the probability of misidentification of another person for the real person. This is considered effective, for example, when identification is executed for screening.

The product as obtained by the following products can be considered to be products example of a plurality of eigenvalues:

$\lambda_1 \times \lambda_2$, $\lambda_1 \times \lambda_3$, $\lambda_1 \times \lambda_4$ $\lambda_1 \times \lambda_2 \times \lambda_3$, $\lambda_1 \times \lambda_2 \times \lambda_3 \times \lambda_4$ Alternatively, the logical multiplication of the conditions that the eigenvalues $\lambda_1$, $\lambda_2$, $\lambda_3$ and $\lambda_4$ are higher than respective threshold values $s_1$, $s_2$, $s_3$ and $s_4$ may be established as shown in the following logical multiplication, and one of the dictionary subspaces satisfying the logical multiplication that has the highest similarity, may be output as an identification result.

$(\lambda_1 > s_1) \cap (\lambda_2 > s_2) \cap (\lambda_3 > s_3) \cap (\lambda_4 > s_4)$ As described above, the face recognizing apparatus according to the embodiment of the invention can discriminate a photographed face from a real face.

The embodiments of the invention can provide a three-dimensional object recognizing apparatus capable of distinguishing a real object from its picture.

Additional advantages and modifications will readily occur to those skilled in the art. Therefore, the embodiments of the invention in its broader aspects are not limited to the specific details and representative embodiments shown and described herein. Accordingly, various modifications may be made without departing from the spirit or scope of the general inventive concept as defined by the appended claims and their equivalents.

What is claimed is:

1. An object recognizing apparatus comprising:

an image acquiring unit configured to acquire images of an object in different directions;

a subspace creating unit configured to create an N-dimensional subspace from the images acquired;

a dictionary which stores basis vectors included in an M-dimensional subspace created from images of a comparison object to be compared with the object, the images of the comparison object being obtained in different directions;

an eigenvalue acquiring unit configured to acquire eigenvalues of a matrix X, the eigenvalues being used as angles between the N-dimensional subspace and the M-dimensional subspace, the matrix X being expressed by following equations:

$X = (x_{ij})$, $$x_{ij} = \sum_{m=1}^{M} (\psi_i, \phi_m)(\phi_m, \psi_j), \text{ or}$$

$$x_{ij} = \sum_{n=1}^{N} (\phi_i, \psi_n)(\psi_n, \phi_j),$$

where $\phi 1$, $\phi 2$, $\phi 3$, . . . , $\phi N$ represent basis vectors of the N-dimensional subspace, and $\phi 1$, $\phi 2$, $\phi 3$, . . . , $\phi M$ represent basis vectors of the M-dimensional subspace; and an identifying unit configured to identify the object based on a similarity determined by the eigenvalues acquired, at least one of a second highest one and a third highest one of the eigenvalues being used as the similarity.

2. The object recognizing apparatus according to claim 1, wherein a product of a predetermined number of the eigenvalues is used as the similarity by the identifying unit.

3. The object recognizing apparatus according to claim 1, wherein a product of a highest one, the second highest one and the third highest one of the eigenvalues is used as the similarity by the identifying unit.

4. An object recognizing method comprising:

acquiring images of an object in different directions;

creating an N-dimensional subspace from the images acquired;

acquiring eigenvalues of a matrix x the eigenvalues being used as angles between the N-dimensional subspace and an M-dimensional subspace stored in a dictionary, the matrix x being expressed by following equations:

$$X=(x_{ij}),$$

$$x_{ij} = \sum_{m=1}^{M} (\psi_i, \phi_m)(\phi_m, \psi_j), \text{ or}$$

$$x_{ij} = \sum_{n=1}^{N} (\phi_i, \psi_n)(\psi_n, \phi_j),$$

where $\phi 1, \phi 2, \phi 3, \ldots, \phi N$ represent basis vectors of the N-dimensional subspace, and $\phi 1, \phi 2, \phi 3, \ldots, \phi M$ represent basis vectors of the M-dimensional subspace; and identifying the object based on a similarity determined by the eigenvalues acquired, at least one of a second highest one and a third highest one of the eigenvalues being used as the similarity.

5. The object recognizing method according to claim 4, wherein a product of a predetermined number of the eigenvalues is used as the similarity.

6. The object recognizing method according to claim 4, wherein a product of a highest one, the second highest one and the third highest one of the eigenvalues is used as the similarity.

7. An object recognizing computer program product configured to store program instructions for execution on a computer system enabling the computer system to perform:

acquiring images of an object in different directions;

creating an N-dimensional subspace from the images acquired;

acquiring eigenvalues of a matrix X, the eigenvalues being used as angles between the N-dimensional subspace and an M-dimensional subspace stored in a dictionary, the matrix X being expressed by following equations:

$$X=(x_{ij}),$$

$$x_{ij} = \sum_{m=1}^{M} (\psi_i, \phi_m)(\phi_m, \psi_j), \text{ or}$$

$$x_{ij} = \sum_{n=1}^{N} (\phi_i, \psi_n)(\psi_n, \phi_j),$$

where $\phi 1, \phi 2, \phi 3, \ldots, \phi N$ represent basis vectors of the N-dimensional subspace, and $\phi 1, \phi 2, \phi 3, \ldots, \phi M$ represent basis vectors of the M-dimensional subspace; and identifying the object based on a similarity determined by the eigenvalues acquired, at least one of a second highest one and a third highest one of the eigenvalues being used as the similarity.

8. The object recognizing computer program product according to claim 7, wherein a product of a predetermined number of the eigenvalues is used as the similarity.

9. The object recognizing computer program product according to claim 7, wherein a product of a highest one, the second highest one and the third highest one of the eigenvalues is used as the similarity.

* * * * *